March 17, 1959 J. P. JONES, JR 2,878,440

REGULATED POWER SUPPLY

Filed March 28, 1957 2 Sheets-Sheet 1

INVENTOR.
John Paul Jones, Jr.

March 17, 1959 J. P. JONES, JR 2,878,440

REGULATED POWER SUPPLY

Filed March 28, 1957 2 Sheets-Sheet 2

INVENTOR.
John Paul Jones, Jr.

United States Patent Office 2,878,440
Patented Mar. 17, 1959

2,878,440

REGULATED POWER SUPPLY

John Paul Jones, Jr., Pottstown, Pa., assignor to Navigation Computer Corporation, a corporation of Pennsylvania Application March 28, 1957, Serial No. 649,080

12 Claims. (Cl. 323—22)

This invention relates in general to regulated power supply circuit and in particular to circuits of this type utilizing semi-conductor amplifier devices such as transistors.

In many electrical systems circuitry is provided to maintain the output voltage of the power supply constant despite changes in the load current drawn from the supply, or changes in the input voltage. In addition, the circuitry is usually designed to filter out the alternating current ripple component which is present in the unfiltered direct-current input voltage. The conventional circuits for regulating the output voltage of a power supply are of either the series or parallel type. The series regulated type power supply, which is often preferred, comprises, in conventional systems, a feedback circuit which utilizes direct-current amplifiers, such as tubes or transistors. The direct-current amplifiers must be very stable. If transistors are used, it is difficult and expensive to stabilize the circuit, particularly with respect to ambient temperature variations. To provide the requisite gain for proper regulation when transistors are used, moreover, several amplifier stages must be provided in the prior art circuits, even though the range of output voltages is small. This is space consuming and not economical.

It is, therefore, an object of the present invention to provide improved regulated power supply circuits utilizing transistors.

It is another and important object of this invention to provide improved transistor regulated power supply circuits which are stable and reliable in operation.

It is yet another object of this invention to provide an improved circuit, including transistors, for precisely regulating a relatively high current, low voltage power supply.

It is a still further object of this invention to provide improved transistor regulated power supply circuits wherein sufficient gain for proper operation is achieved without the need for a plurality of transistor amplifier stages.

Yet another object of the present invention is to provide an improved regulated power supply circuit which is relatively simple in construction yet extremely reliable in operation.

A regulated power supply circuit embodying the invention includes a first transistor, preferably of the power type, which is connected in series between the power supply input and output terminals. A second transistor is also provided and is connected, in accordance with the invention, as a regenerative amplifier. A voltage reference such as a Zener diode is connected with the second transistor, which is adapted to provide regenerative amplifying operation in response to small variations in the input voltage or load current. The regenerative amplifier transistor, which serves as a voltage comparator and pulse generator, is coupled with the series transistor, which conducts more heavily in response to the regenerative amplifying operation of the second transistor, thus compensating for load current and input voltage variations and providing a precisely regulated output voltage.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1:
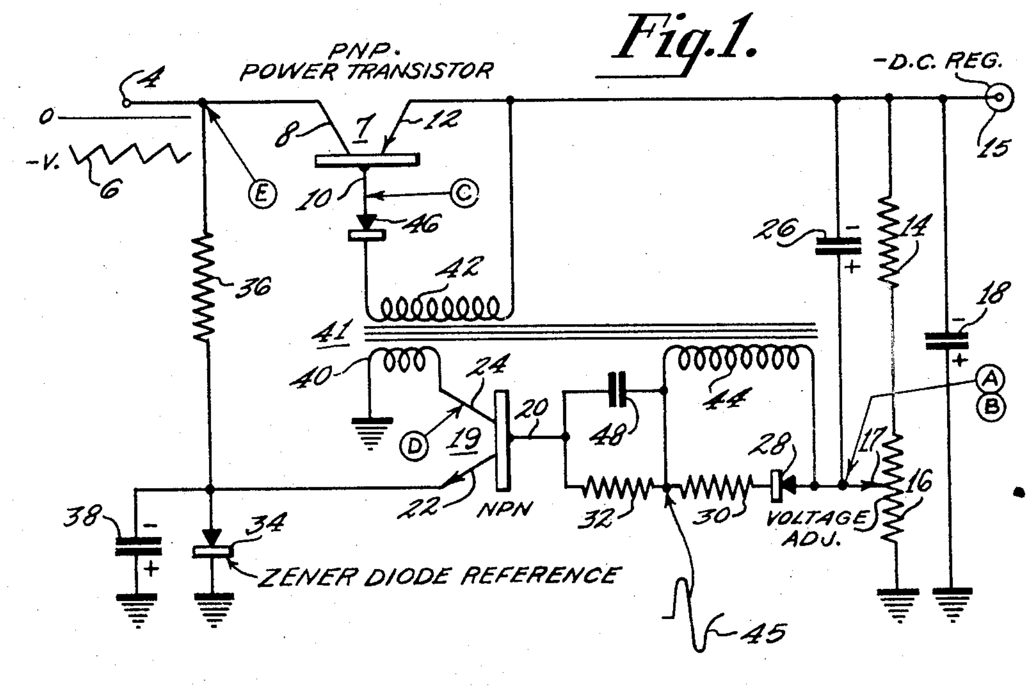
Figure 1 is a schematic circuit diagram of a regulated power supply embodying the invention.

Referring now to the drawing wherein like elements are indicated by like reference numerals throughout the figures, and referring particularly to Figure 1, a regulated power supply embodying the invention includes an input terminal 4 which is adapted to be connected to an unregulated negative direct-current supply source (not shown). The supply source provides a negative direct-current voltage of the general form indicated by the numeral 6. This voltage is applied to the collector of a series power transistor 7, illustrated as a power transistor of the P–N–P junction type. The transistor 7 also includes a base electrode 10 and an emitter electrode 12. The emitter 12 is connected through a pair of resistors 14 and 16 to a point of reference potential in the circuit, which has been illustrated as circuit ground. The emitter 12 is also connected to an output terminal 15 which would normally be connected to the load (not shown). An output capacitor 18 is connected in parallel with the resistors 14 and 16.

The resistor 16 includes a variable tap 17 which can be adjusted to set the voltage on the base 20 of a second transistor 19 to the desired level, which voltage level is equal to the voltage on the emitter 22 of this transistor. A capacitor 26 is connected in parallel with the resistor 14. The transistor 19, which is connected, in accordance with the present invention, as a regenerative amplifier, is a junction transistor of the N–P–N type in the present example and includes, in addition to the base 20 and the emitter 22, a collector 24. The variable tap 17 is connected through a damping network, comprising a serially connected resistor 28 and a diode 30, and a further resistor 32 to the base 20 of the transistor 19.

The voltage reference for the transistor 19 comprises a Zener diode 34 which is connected with the emitter 22. The Zener diode 34 is biased in the reverse direction by the direct-current input supply source. To this end, the diode 34 is connected through a resistor 36 to the input terminal 4. The Zener diode 34 will normally be selected to have a characteristic wherein the voltage on the emitter 22 of the transistor 19 will be approximately 7 volts, negative. If the reference voltage is selected to be 7 volts, then the position of the variable tap 17 on the sampling resistor 16 will be adjusted so that the voltage on the base 20 will be 7 volts negative, the resulting base-emitter voltage of the transistor 19 being zero. A by-pass capacitor 38 is connected in shunt with the Zener diode 34.

The output circuit for the N–P–N transistor 19 includes the primary winding 40 of a transformer 41, which also includes a pair of secondary windings 42 and 44. One of the terminals of the first secondary winding 42 is connected through a unilateral conducting device, such as a diode 46, to the base 10 of the power transistor 7. The diode 46 is poled to provide a high impedance to positive pulses and a low impedance to negative pulses. The other terminal of the secondary winding 42 is connected directly with the collector 12 of the power transistor 7.

One terminal of the other secondary winding 44, which is wound on the same core as the windings 40 and 42 and is in regenerative coupling relation with the primary winding 40, is connected through a capacitor 48 to the base 20 of the N–P–N transistor 19. The other terminal of the winding 44 is connected to the variable tap 17. By this circuit arrangement, in accordance with the teachings of the invention, a regenerative amplifier capable of providing extremely high voltage gain in the circuit is provided. Voltage gains in the order of, for example, 2500 are easily possible. It is to be noted that the transistor 19 serves, in accordance with the invention, as a voltage comparator and pulse generator.

To explain the operation of the circuit, reference will be made to the waveforms illustrated in Figure 2 in conjunction with the circuit illustrated in Figure 1. As was pointed out hereinbefore, the voltage on the base 20 of the regenerative amplifier transistor 19 is selected to be of equal amplitude to the voltage on the emitter 22 of that transistor as established by the voltage reference Zener diode 34. If the load current drawn from the supply or the input voltage should vary, the output capacitor 18 will discharge and the voltage at the variable tap 17 (points A and B) will fall below (i. e., become less negative) than the emitter voltage of the transistor 19, which in the present example has been assumed to be 7 volts, negative. The alternating current waveform as it appears on the tap 17 is shown by the waveforms A and B in Figure 2 for light loads and heavy loads, respectively. These waveforms are in the order of millivolts, the pulses caused by a change in the input voltage or load current being very small, because of the relatively low impedance of the sampling resistor 16 and the parallel capacitors 18 and 26. The decay slope of these waveforms is caused by the discharge of the capacitor 18 into the load. At relatively small loads the discharge of the capacitor 18 is slow and the voltage at the tap 17 decays below the firing threshold of the transistor 19 at relatively long intervals.

If the voltage at the variable tap 17 falls below the emitter voltage as little as 2 millivolts, the emitter-base voltage of the transistor 19 will be in the forward or conducting direction and the transistor 19 will begin to conduct and will go into one regenerative cycle of oscillation as provided by the regenerative feedback between the collector 24 and the base 20 through the transformer windings 40 and 44. The damping network comprising the series diode 28 and resistor 30 in the base circuit of the regenerative transistor 19 prevents continuous oscillation by quenching oscillations during the first overshoot period. The resistor 30 loads the secondary winding 44 when the diode 30 conducts to provide the waveform indicated by the reference numeral 45. Accordingly, the transistor 19 will not oscillate again until the voltage at the tap 17 falls at least 2 millivolts below the reference or emitter voltage. Each time the transistor 19 goes through one regenerative cycle of operation, a pulse of voltage is produced at the collector 24 (point D) as shown by the collector waveform in Figure 2D. These voltage pulses are coupled through the secondary winding 42 and applied to the base 14 of the power transistor 7 through the diode 46, causing the power transistor 7 to conduct more heavily. The pulses provided by the regenerative amplifier transistor 7 are of a relatively high frequency compared to the upper frequency response of the power transistor 7. The result is that the output pulses from the transistor 19 are integrated into the base 10 of the transistor 7 as shown by the waveform in Figure 2C. Accordingly, more current passes to the output circuit raising the voltage that has decayed over the prior pulse period. The result is that a constant output voltage within ±.02% is available at the output terminal 15.

Figure 2:
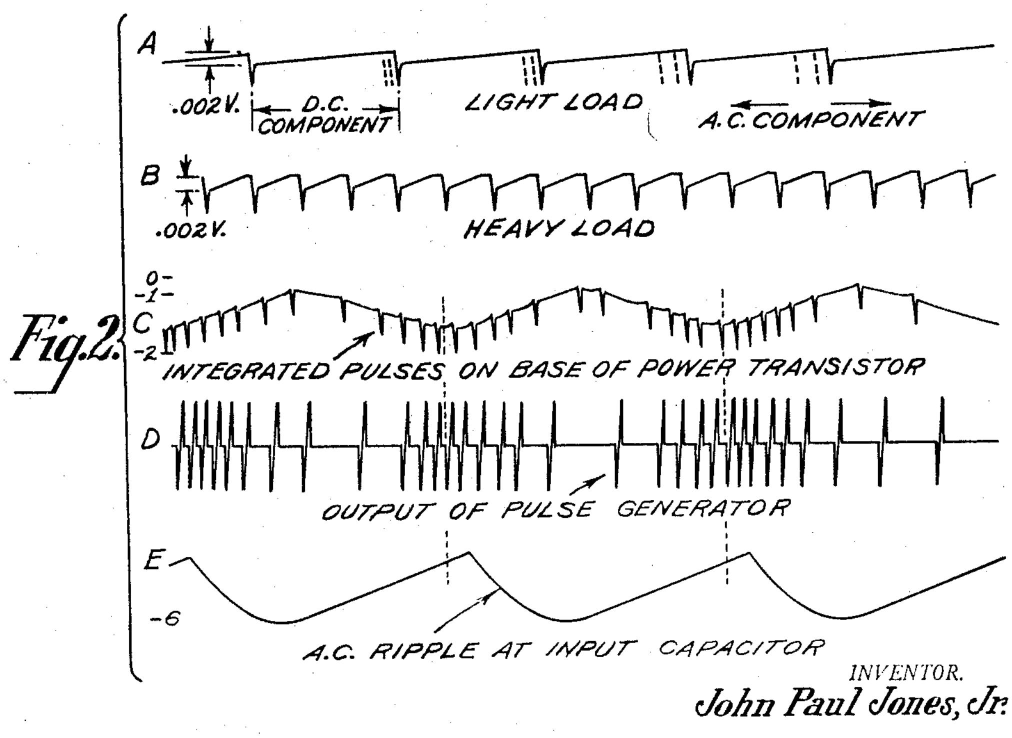
Figure 2 is a graph illustrating the various waveforms present in different points in a circuit of the type illustrated in Figure 1.

If the output load becomes greater, the capacitor 18 will discharge more rapidly as shown by the waveform B in Figure 2. As a result, the voltage at the variable tap 17 will fall below the conducting threshold of the transistor 19 more often and the transistor 19 will provide regenerative operation more often. Accordingly, more pulses will be fed into the base 10 of the power transistor 7 as shown by the waveform in Figure 2C. The frequency of the pulses which are applied to the base-emitter circuit of the power transistor 7 is directly proportional to the load current. Since the transistor 19 is connected as a regenerative amplifier and provides high gain factors, the output voltage will be maintained within several millivolts of the reference voltage applied to the emitter 22 of the regenerative amplifier transistor 19.

A circuit of the type illustrated in Figure 1 and embodying the present invention has a very rapid response. For example, this circuit will respond to a full load of 0.75 ampere in 10 microseconds. For this reason, the circuit will compensate for rapid alternating current variations at the input. These variations could be, for example, the unfiltered alternating-current ripple component of the input supply voltage. In effect, the power transistor 7 acts like a reactive element to filter out the unwanted ripple component as will be seen from a consideration of the waveforms depicted in Figures 2C, 2D, and 2E. The alternating current ripple component as it would appear at the input terminal 4 is depicted by the waveform of Figure 2E. It is to be noted that the waveform shown in Figure 2E has been depicted on a reduced voltage scale from the remaining waveforms of Figure 2. The presence of the ripple frequency modulates the frequency of the pulse interval of the pulses generated by the regenerative amplifier transistor as shown by the waveform in Figure 2D. That is to say, the frequency of the pulses appearing at the collector 24 of the regenerative amplifier transistor will be proportional to the rate of change or frequency of the input ripple component. The pulses so generated by the regenerative amplifier transistor stage are, as was explained hereinbefore, integrated into the base 10 of the power transistor 7 as shown by the waveform in Figure 2C. Accordingly, the rate of change of the undesired ripple component will cause the power transistor to conduct more or less heavily, thus compensating for the ripple component.

In actual design of a circuit embodying the invention, many variations are possible without departing from its scope or spirit. In the present example, a P–N–P power transsistor has been used and illustrated since this conductivity type is more readily commercially available. If a positive, rather than a negative, supply were to be accommodated the collector and emitter electrodes of the P–N–P power transistor could be reversed in the circuit, while the regenerative transsistor 19 would then be selected to be of the P–N–P type. If N–P–N junction power transistors are commercially available, then a positive supply could be accommodated by changing the conductivity type of each of the transistors and the polarity of each of the diodes. The circuit could also be designed using two N–P–N transistors for a negative supply by reversing the emitter and collector connections of the power transistor.

Figure 3:
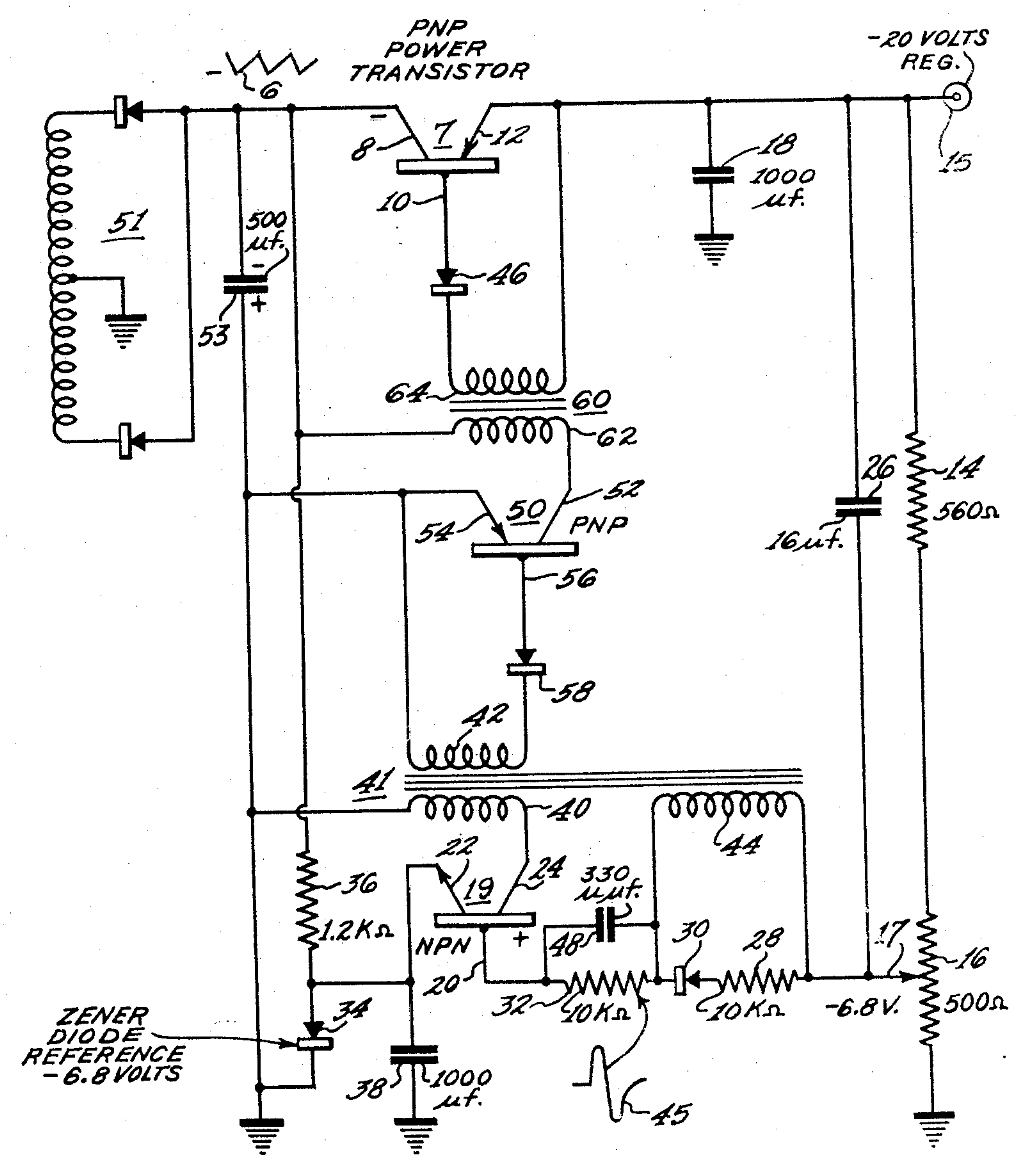
Figure 3 is a schematic circuit diagram of a regulated power supply illustrating another embodiment of the invention.

In Figure 3, reference to which is now made, an extra amplifier stage including a transistor 50 is used to provide even more circuit gain in the event wider ranges of output voltages are desired. Typical values for the circuit components are also listed by way of example, only. These values are for supplying a regulated negative voltage of 20 volts at the output terminal 15 while using a Zener diode reference for the emitter 22 of the regenerative amplifier transistor 19 of 6.8 volts negative. The variable tap 17 is, therefore, adjusted so that the voltage on the base 20 of the transistor 19 will normally be 6.8 volts, negative, or equal to the emitter voltage of the transistor 19 when the output is at 20 volts, negative. The unregulated supply voltage is applied to the collector 8 of the power transistor 7 through a conventional fullwave rectifier circuit 51. An input capacitor 53 is connected from the rectifier circuit to ground.

The transistor 50 is of the P–N–P type and includes a collector 52, an emitter 54, and a base 56. The secondary winding 42 of the regenerative amplifier transformer 41 is connected directly with the emitter 54 and through a diode 58 to the base 56 of the transistor 50. The diode 58 is poled in the circuit to provide a relatively high impedance to pulses of a positive polarity and a relatively low impedance to pulses of negative polarity. The negative pulses which are applied to the base 56 from the regenerative amplifier transistor 19 through the transformer 41 are amplified by the transistor 50 and are coupled through a transformer 60 to the base 10 of the power transistor 7. The transformer 60 includes a primary winding 62 and a secondary winding 64. The primary winding 62 is connected between the collector 52 of the transistor 50 and the input circuit 51. The secondary winding 64 is connected through the diode 46 to the base 10 of the power transistor 7 and to the emitter 12 of the transistor 7.

Except for the extra circuit gain available by virtue of the inclusion of the extra transistor amplifier stage, thus permitting a wider range of available output voltage, the circuit illustrated in Figure 3 operates in an identical manner to the circuit illustrated in Figure 1. Moreover, it is characterized by similar advantages. Both circuits are stable and reliable in operation. Since direct-current amplifiers are not used, these circuits are inherently more stable with variations in temperature than the typical prior art circuits. In addition, by using a regenerative amplifier stage extremely high circuit gain is possible, enabling very precise and accurate regulation of a high current-low voltage power supply. These desirable results are achieved, moreover, without the need for a plurality of stages and with circuits of relatively simple construction.

What is claimed is:

1. A regulated power supply circuit comprising, in combination, an input terminal, an output terminal, a first transistor connected in series between said input and output terminals, a regenerative amplifier circuit including a second transistor, voltage reference means connected with said second transistor, means responsive to variations in the input voltage and output current of said supply circuit connected with said second transistor, means providing a feedback circuit for said transistor to provide regenerative high voltage gain amplifying operation thereof and at least one cycle of oscillation in response to said variations, means for deriving a voltage pulse from said second transistor during said cycle of oscillation, and means coupling said second transistor with said first transistor to apply said voltage pulse thereto and provide increased conduction of said first transistor in response to oscillation of said second transistor to compensate for said variations.

2. A regulated power supply circuit as defined in claim 1 wherein said first transistor is a power transistor of one conductivity type and said second transistor is of an opposite conductivity type.

3. A regulated power supply circuit as defined in claim 1 wherein said voltage reference means is a Zener diode.

4. A regulated power supply circuit as defined in claim 1 wherein said means responsive to variations in the input voltage and output current of said supply circuit is connected through a damping network comprising a serially connected resistor and a diode to said second transistor.

5. A regulated power supply circuit comprising, in combination, an input and an output terminal, a power transistor including base, emitter, and collector electrodes, means connecting said collector and emitter electrodes in series between said input and output terminals, impedance means connected with said output terminal, a second transistor including base, emitter, and collector electrodes, voltage reference means connected with the emitter of said second transistor, means providing an output transformer including a primary winding and a pair of secondary windings, means connecting said primary winding with the collector of said second transistor, means coupling one of said secondary windings with the base and emitter electrodes of said power transistor, means connecting the other of said secondary windings with the base electrode of said second transistor to provide with said primary winding a regenerative feedback path between the collector and base electrodes of said second transistor, means including a damping network connecting said impedance means with the base electrode of said second transistor to provide regenerative amplifying operation thereof in response to voltage variations across said impedance element and output voltage pulses from said second transistor which are applied through said one of said secondary windings to the base of said power transistor to alter the current conducting condition thereof.

6. A regulated power supply circuit comprising, in combination, an input terminal adapted to be connected to an unregulated power supply source and an output terminal adapted to be connected to a load circuit, a power transistor including base, emitter, and collector electrodes, first direct current conductive means connecting said collector electrode with said input terminal, second direct-current conductive means connecting said emitter electrode with said output terminal, variable impedance means connected in parallel with said load circuit and between said output terminal and a point of reference potential in said supply circuit, said impedance means providing voltage variations in response to variations in the input voltage and output current of said supply circuit, a second transistor including base, emitter, and collector electrodes, a Zener diode connected between the emitter of said second transistor and said point of reference potential to provide a voltage reference for said second transistor, means providing an output transformer including a primary winding and a pair of secondary windings, said primary winding and said secondary windings being in inductive coupling relation, means connecting said primary winding between the collector of said second transistor and said point of reference potential, means coupling one of said secondary windings between the base and emitter electrodes of said power transistor, means connecting the other of said secondary windings with the base electrode of said second transistor to provide with said primary winding a regenerative feedback path between the collector and base electrodes of said second transistor, means including a damping network including a serially connected diode and a resistor connecting said impedance means with the base electrode of said second transistor to provide regenerative amplifying operation thereof in response to said voltage variations across said impedance element and output voltage pulses from said second transistor which are applied though said one of said secondary windings to the base of said power transistor to alter the current conducting condition thereof to compensate for said input voltage and output current variations.

7. A regulated power supply circuit as defined in claim 6 wherein said diode and said resistor are connected in parallel with said other of said secondary windings to prevent continuous oscillation of said second transistor.

8. A regulated power supply circuit comprising, in combination, an input terminal, an output terminal, a first transistor including at least a collector-emitter conducting path and a base-emitter conducting path, means connecting said collector-emitter path in series between said input and output terminals, a regenerative amplifier circuit including a second transistor having base, emitter, and collector electrodes, voltage reference means connected with said emitter electrode, means providing a regenerative feedback circuit connected with said collector and base electrode to provide high gain regenerative operation of said transistor and oscillation in response to variations in the input voltage and output current of said supply circuit, means connected with the base electrode of said second transistor to vary the bias thereof in response to variations in input voltage and output current to provide said regenerative amplifying operation, means for deriving output pulses from the collector electrode of said second transistor in response to the regenerative amplifying operation thereof, and means coupling the collector of said second transistor with said first transistor to apply said output pulses to the base-emitter path of said first transistor and provide increased conduction of said first transistor in response to said output pulses to compensate for said variations.

9. A regulated power supply circuit comprising, in combination, an input and an output terminal adapted to be connected to a load circuit, a first transistor including base, emitter, and collector electrodes, means connecting said collector electrode with said input terminal, means connecting said emitter electrode with said output terminal, impedance means connected with said output terminal and in parallel with said load circuit, a second transistor including base, emitter, and collector electrodes, voltage reference means connected with the emitter of said second transistor, means providing an output transformer including a primary and a pair of secondary windings, means connecting said primary winding with the collector of said second transistor, means including a third transistor coupling one of said secondary windings with the base and emitter electrodes of said first transistor, means connecting the other of said secondary windings with the base electrode of said second transistor to provide with said primary winding a regenerative feedback path between the collector and base electrodes of said second transistor and regenerative amplifying operation thereof, and means connecting said impedance means with the base electrode of said second transistor to provide regenerative amplifying operation thereof in response to voltage variations across said impedance element to provide output voltage pulses from said second transistor which are applied through said one of said secondary windings to the base of said power transistor to alter the current conducting condition thereof.

10. A regulated power supply circuit comprising, in combination, an input terminal and an output terminal adapted to be connected to a load circuit, a first transistor including a collector-emitter path and a base-emitter path, means connecting said collector-emitter path between said input and output terminals, a second transistor including base, emitter, and collector electrodes, a Zener diode connected with the emitter of said second transistor to apply a predetermined reference voltage to the emitter of said second transistor, variable impedance means connected with said output terminal and in parallel with said load circuit and normally providing a voltage on the base of said second transistor equal to said reference voltage, means providing an output transformer including a primary winding and a pair of secondary windings, means connecting said primary winding with the collector of said second transistor, means coupling one of said secondary windings with the base-emitter path of said first transistor, means connecting the other of said secondary windings with the base electrode of said second transistor to provide a regenerative feedback path between the collector and base electrodes thereof, and means connecting said impedance means with the base electrode of said second transistor to provide regenerative amplifying operation thereof in response to voltage variations across said impedance element and output voltage pulses from said second transistor which are applied through said one of said secondary windings to the base-emitter path of said first transistor to alter the current conducting condition thereof.

11. A regulated power supply circuit comprising, in combination, an input terminal adapted to be connected with an unregulated power supply source and an output terminal adapted to be connected to a load circuit, a power transistor including base, emitter, and collector electrodes, first direct current conductive means connecting said collector electrode with said input terminal, second direct-current conductive means connecting said emitter electrode with said output terminal, impedance means connected with said output terminal and in parallel with said load circuit, a second transistor including base, emitter, and collector electrodes, a Zener diode connected with the emitter of said second transistor to provide a voltage reference therefor, means providing an output transformer including a primary winding and a pair of secondary windings, said primary winding and said secondary windings being in inductive coupling relation, means connecting said primary winding with the collector of said second transistor, means coupling one of said secondary windings with the base and emitter electrodes of said power transistor, means connecting the other of said secondary windings with the base electrode of said second transistor to provide a regenerative feedback path with said primary winding between the collector and base electrodes of said second transistor, and means including a damping network connecting said impedance means with the base electrode of said second transistor to provide regenerative amplifying operation thereof in response to voltage variations across said impedance element and output voltage pulses from said second transistor which are applied through said one of said secondary windings to the base of said power transistor to alter the current conducting condition thereof.

12. A regulated power supply circuit comprising, in combination, an input terminal adapted to be connected to a negative unregulated power supply source and an output terminal adapted to be connected to a load circuit, a P–N–P junction power transistor including base, emitter, and collector electrodes, first direct current conductive means connecting said collector electrode with said input terminal, second direct-current conductive connecting means connecting said emitter electrode with said output terminal, variable impedance means connected with said output terminal and in parallel with said load circuit, an N–P–N junction transistor including base, emitter, and collector electrodes, a Zener diode connected with the emitter of said second transistor to provide a negative reference voltage therefor, means providing an output transformer including a primary winding and a pair of secondary windings, means connecting said primary winding with the collector of said N–P–N transistor, means coupling one of said secondary windings with the base and emitter electrodes of said P–N–P transistor, means connecting said one of said secondary windings with the base electrode of said N–P–N transistor to provide with said primary winding a regenerative feedback path between the collector and base electrodes of said N–P–N transistor, and means connecting said impedance means with the base electrode of said N–P–N transistor to provide regenerative amplifying operation thereof in response to voltage variations across said impedance element to provide output voltage pulses from said N–P–N transistor which are applied through said one of said secondary windings to the base of said P–N–P transistor to alter the current conducting condition thereof.

References Cited in the file of this patent

UNITED STATES PATENTS

| | | |
|---|---|---|
| 2,497,908 | Philpott | Feb. 21, 1950 |
| 2,693,568 | Chase | Nov. 2, 1954 |
| 2,703,368 | Wrathall | Mar. 1, 1955 |
| 2,751,549 | Chase | June 19, 1956 |
| 2,816,230 | Lindsay | Dec. 10, 1957 |